Figure 1:
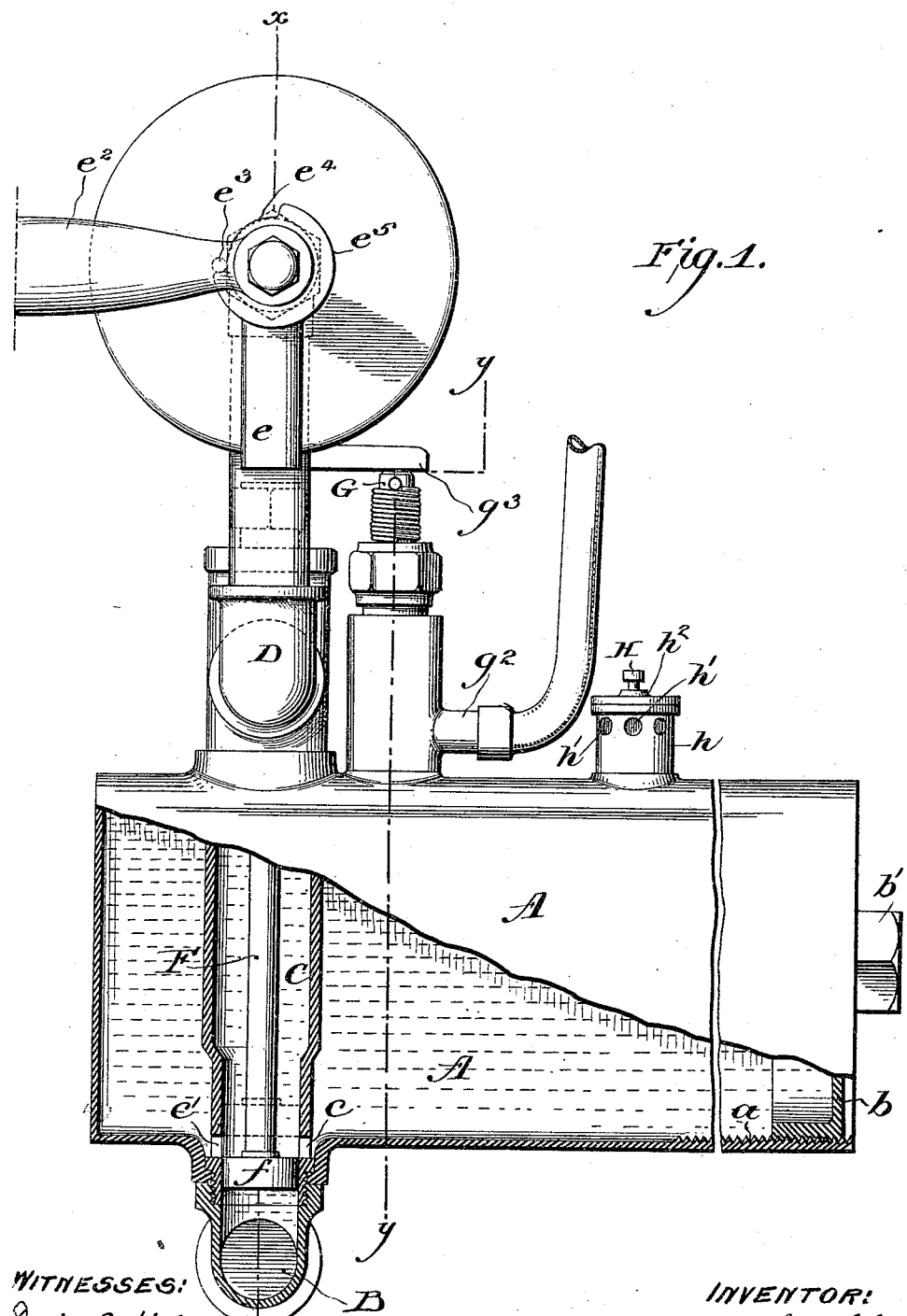

(No Model.) 3 Sheets—Sheet 1.

A. T. WILKINS.
LIQUID MEASURING AND DELIVERING APPARATUS.

No. 493,138. Patented Mar. 7, 1893.

WITNESSES:
David S. Williams
Frank S. Busser

INVENTOR:
Alfred T. Wilkins
by his atty (No Model.) 3 Sheets—Sheet 2.
A. T. WILKINS.
LIQUID MEASURING AND DELIVERING APPARATUS.
No. 493,138. Patented Mar. 7, 1893.
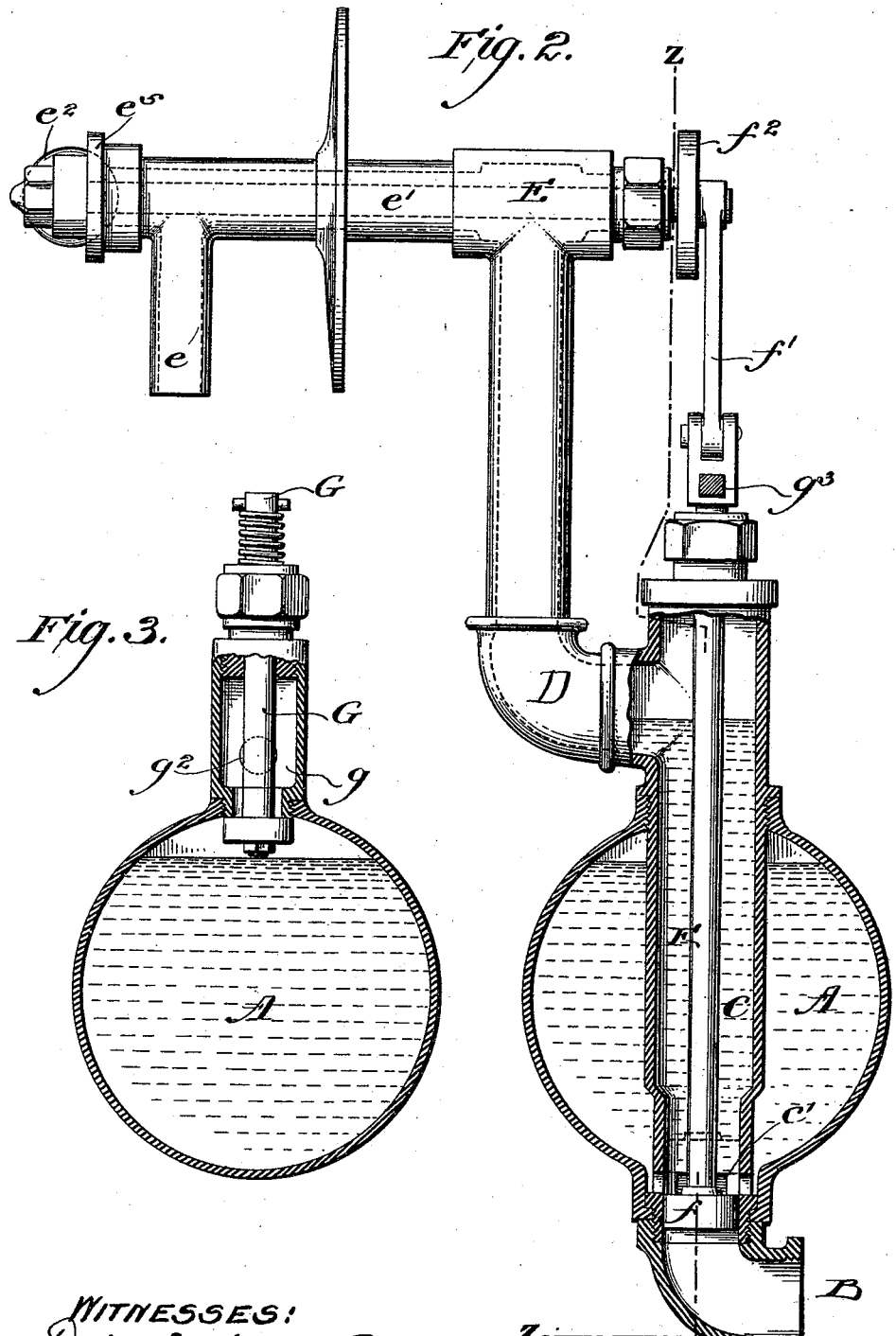

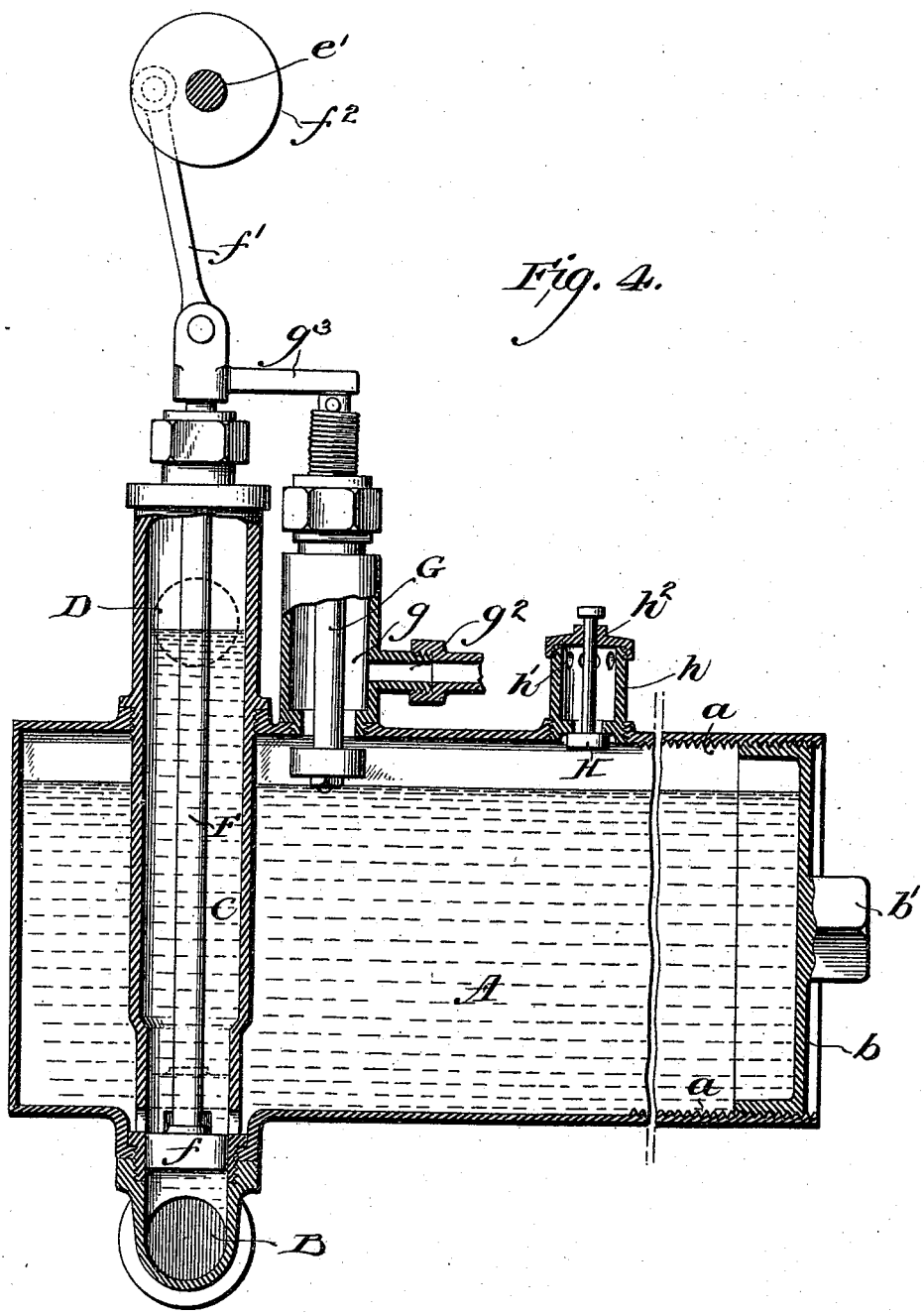

UNITED STATES PATENT OFFICE.

ALFRED T. WILKINS, OF PHILADELPHIA, PENNSYLVANIA, ASSIGNOR OF ONE-HALF TO DANIEL DEVER, OF SAME PLACE.

LIQUID MEASURING AND DELIVERING APPARATUS.

SPECIFICATION forming part of Letters Patent No. 493,138, dated March 7, 1893.

Application filed March 10, 1892. Renewed February 7, 1893. Serial No. 461,400. (No model.)

*To all whom it may concern:*

Be it known that I, ALFRED T. WILKINS, a citizen of the United States, residing at Philadelphia, county of Philadelphia, and State of Pennsylvania, have invented a new and useful Improvement in Liquid Measuring and Delivering Apparatus, of which the following is a full, clear, and exact description, reference being had to the accompanying drawings, which form a part of this specification.

My invention has for its object to facilitate the delivery of a given amount of liquid from a storage reservoir or main receptacle for said liquid and to deliver accurately a given quantity.

My improvement is especially applicable to the delivery of beer where certain quantities (as, for instance, a quart) are desired, and the purchaser can receive said amount with certainty, avoiding loss, both to purchaser and seller, occasioned by drawing directly from the tap without any fixed method of measuring; although it can be used for the measuring and delivery of liquids other than beer.

My invention consists in certain improvements and arrangement of apparatus, whereby this result can be obtained. As the use of my apparatus with beer will form one of its most advantageous purposes, I will first describe my invention as used with beer.

In the drawings—Figure 1 is a side elevation, partly in section, of my improved apparatus. Fig. 2 is a section on the line $x$—$x$, Fig. 1. Fig. 3 is a section on line $y$—$y$, Fig. 1 and Fig. 4 is a section on the line $z$—$z$, Fig. 2.

Similar letters denote similar parts.

A is a reservoir, preferably of cylindrical form and threaded at one end, as shown at $a$, the head $b$ of the cylinder being also threaded and working in the threaded end $a$, a bolt $b'$ enabling the head to be moved in and out to increase or decrease the volume of the reservoir A. This reservoir A is formed of a volume to hold a certain amount of liquid (say a quart) when the head $b$ is in its most extended position, and is graduated so that moving the head $b$ inward will decrease the capacity a fixed amount, so that the capacity can be varied from a quart to any proportionate fraction of a quart. The other end of the cylinder A and its corresponding head may also be constructed in the same manner as before described with reference to the end $a$ and head $b$.

B is a pipe leading from the main liquid reservoir—the beer barrel, as is generally the case where beer is the liquid. The beer in the barrel is under air pressure, as is well known, to force it from the barrel to the place of its delivery to purchaser. If the beer in the barrel is above the level of the beer in the reservoir, air pressure is of course not necessary to force the beer through the connecting pipe and into the reservoir. The pipe B terminates in the pipe C, to which it is connected by a union in the well-known manner. This pipe C passes through the reservoir A and is closed at its upper end.

D is a pipe entering the pipe C and also opening into pipe E, which pipe E is closed at both ends and is provided with the faucet or outlet $e$. $c\ c'$ are openings from the pipe C to the reservoir A.

F is a plunger rod working in the pipe C and having at its end the plunger $f$. This plunger rod F passes through a stuffing-box at the top of the pipe C and is connected to the link $f'$, the other end of the link being connected to the disk $f^2$ at or near its periphery. The disk $f^2$ is on the shaft $e'$, which passes through the pipe E and has on its end the handle $e^2$. Connected to the handle $e^2$ is the projecting pin $e^3$, which rides on the face of the cam $e^4$ on the outer crossing of the pipe E. This cam $e^4$ has the raised portion $e^5$, against which the pin $e^3$ strikes in moving in either direction, so that by this means the extent of the throw of the handle $e^2$ and shaft $e'$ are limited and governed.

G is a spring seated valve working in the guide $g$, connected to and opening into the reservoir A. A pipe $g^2$ is adapted to carry air into the guide $g$, through which, when the valve is open, the air passes into the reservoir A. This pipe $g^2$ can be connected to the same air-supply which forces the beer from the barrel. Connected to the rod F is the projecting arm $g^3$, which projects in line with the valve-rod of the spring-seated valve G.

H is a check-valve in the case $h$, which case has the orifices $h'$. The stem of the valve H works in the guide $h^2$ and descends by gravity.

The operation, taking the reservoir as empty, is as follows: The handle $e^2$ is turned, bringing the plunger-rod F so that the plunger $f$ is brought into the position shown in dotted lines, Fig. 4, when the beer from the barrel will first pass through pipe B into the lower part of the pipe C, and through orifice $c$, $c'$, into the reservoir A, the plunger $f$ preventing its further passage through the pipe C. This continues until the reservoir A is full. When a customer desires a measured quantity of beer—say a quart—the reservoir is graduated to hold a quart, and, as before described, beer admitted to fill the reservoir. The handle $e^2$ is then turned so that the plunger-rod F is forced downward until the plunger $f$ is below the orifices $c$, $c'$, thus shutting off the supply of beer from the pipe B to the reservoir and admitting a flow of beer from the reservoir to the pipe C. This same movement of the rod F causes the projecting arm $g^3$ to strike and force down the valve G, admitting air under pressure to the reservoir A, which forces the beer through the orifices $c$ $c'$, up through the pipe C, pipe D, pipe E, and is discharged into the receptacle through the discharge pipe or faucet $e$, the plunger $f$ preventing the liquid passing down the pipe C into the pipe B. The check-valve H, when all the beer has passed from the reservoir A, and the pipes leading therefrom, falls by gravity; the air in the reservoir A escapes through said check valve when the beer is introduced; and the valve H rises again and closes when the reservoir is filled with liquid.

I can, by this means, readily serve a given amount of beer and if two or more quarts are desired, then the reservoir can be again filled.

I do not intend to limit myself to the precise arrangement and construction hereinbefore described except so far as the same may be specifically claimed.

Having now fully described my invention, what I claim, and desire to protect by Letters Patent, is—

1. In a liquid measuring and delivering apparatus, in combination, a source of liquid supply, a reservoir, a pipe, an inlet from said pipe to said reservoir, connection between said pipe and the source of liquid supply, a discharge pipe, an outlet from said reservoir to said discharge pipe, an air inlet to said reservoir adapted to receive air under pressure, means substantially as described to open the inlet to said reservoir and close the outlet and vice versa, and means substantially as described to open the air inlet when the discharge is open, and close the same when the discharge is closed.

2. In a liquid measuring and delivering apparatus, the combination of the source of liquid supply, a reservoir, a connecting pipe from the source of supply to the liquid reservoir, a pipe from the reservoir to the delivering point, a valve adapted to open one pipe and close the other, a piston adapted to operate said valve, a valve, guides in which said valve works, a pipe admitting air under pressure to said guides, an arm connected to said piston rod, the valve stem of said valve being in line of movement of said arm, and means substantially as described to move said piston rod.

3. In a liquid measuring and delivering apparatus, in combination, a source of liquid supply, a reservoir, a pipe, inlet from said pipe to said reservoir, connection between said pipe and the source of liquid supply, connection between said pipe and the discharge, a piston in said pipe, a piston rod connected to said piston, a link to one end of which said piston rod is connected, a disk to the periphery of which the other end of said link is connected, a shaft to which said disk is connected, a handle on the end of said shaft, a cam having a raised portion and a pin connected to said handle.

4. In a liquid measuring and delivering apparatus, in combination, a source of liquid supply, a reservoir, a pipe, inlet from said pipe to said reservoir, connection between said pipe and the reservoir, a pipe, as D, entering into said pipe, a pipe, as E, in which said pipe D terminates, and an outlet from said pipe D, a piston in said pipe, a piston rod connected to said piston, a link to one end of which said piston rod is connected, a disk to the periphery of which the other end of said link is connected, a shaft to which said disk is connected, said shaft being in said pipe E, and a handle to the end of said shaft.

5. In a liquid measuring and delivering apparatus, in combination, a source of liquid supply, a reservoir, a pipe, an inlet from said pipe to said reservoir, connection between said pipe and the source of liquid supply, connection between said pipe and the discharge, a piston in said pipe, a piston-rod connected to said piston, a valve on the top of said reservoir, guides in which said valve works, a pipe admitting air under pressure to said guides, an arm connected to said piston-rod, the valve-stem of said valve being in line of movement of said arm, a piston-rod connected to said piston, a link to one end of which said piston-rod is connected, a disk to the periphery of which the other end of said link is connected, a shaft to which said disk is connected, and a handle on the end of said shaft.

In testimony of which invention I have hereunto set my hand.

ALFRED T. WILKINS.

Witnesses:
GEO. W. REED,
DANIEL DEVER.